United States Patent
Adler

(10) Patent No.: US 12,348,870 B2
(45) Date of Patent: Jul. 1, 2025

(54) SPIN-OUT 360-DEGREE CAMERA FOR SMARTPHONE

(71) Applicant: Corephotonics Ltd., Tel Aviv (IL)

(72) Inventor: Gal Adler, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 281 days.

(21) Appl. No.: 18/194,637

(22) Filed: Apr. 2, 2023

(65) Prior Publication Data

US 2023/0328378 A1 Oct. 12, 2023

Related U.S. Application Data

(60) Provisional application No. 63/329,384, filed on Apr. 9, 2022.

(51) Int. Cl.
*H04N 23/69* (2023.01)
*H04N 23/50* (2023.01)
(Continued)

(52) U.S. Cl.
CPC ............ *H04N 23/69* (2023.01); *H04N 23/50* (2023.01); *H04N 23/54* (2023.01); *H04N 23/57* (2023.01)

(58) Field of Classification Search
CPC ........ H04N 23/69; H04N 23/50; H04N 23/54; H04N 23/57; H04N 23/55; H04N 23/667;
(Continued)

(56) References Cited

U.S. PATENT DOCUMENTS

| 2,106,752 A | 2/1938 | Land |
| 2,354,503 A | 7/1944 | Arthur |

(Continued)

FOREIGN PATENT DOCUMENTS

| CN | 101634738 A | 1/2010 |
| CN | 102147519 A | 8/2011 |

(Continued)

OTHER PUBLICATIONS

A compact and cost effective design for cell phone zoom lens, Chang et al., Sep. 2007, 8 pages.

(Continued)

*Primary Examiner* — Nhan T Tran
(74) *Attorney, Agent, or Firm* — Nathan & Associates; Menachem Nathan

(57) ABSTRACT

Camera modules comprising two sub-cameras included in a camera housing and a spin-out actuator. The two sub-cameras are a first sub-camera with first field of view (FOV) $FOV1 \geq 180$ deg oriented along a camera module optical axis and pointing in a first direction and a second sub-camera having a second FOV, $FOV2 \geq 180$ deg, the second sub-camera being oriented along the camera module optical axis and pointing in a second direction which is opposite to the first direction. Such a camera module is operational to capture a 360 degree panoramic image or video stream by combining images obtained with the first sub-camera and the second sub-camera, where the spin-out actuator is operational to rotate the camera housing around an axis perpendicular to the camera module optical axis for switching the camera between a stowed position and a spun-out/operational position.

25 Claims, 5 Drawing Sheets

(51) Int. Cl.
*H04N 23/54* (2023.01)
*H04N 23/57* (2023.01)

(58) Field of Classification Search
CPC . H04N 23/698; H04N 23/531; G02B 13/0045
See application file for complete search history.

(56) References Cited

U.S. PATENT DOCUMENTS

| | | | |
|---|---|---|---|
| 2,378,170 | A | 6/1945 | Aklin |
| 2,441,093 | A | 5/1948 | Aklin |
| 3,388,956 | A | 6/1968 | Eggert et al. |
| 3,524,700 | A | 8/1970 | Eggert et al. |
| 3,558,218 | A | 1/1971 | Grey |
| 3,864,027 | A | 2/1975 | Harada |
| 3,942,876 | A | 3/1976 | Betensky |
| 4,134,645 | A | 1/1979 | Sugiyama et al. |
| 4,338,001 | A | 7/1982 | Matsui |
| 4,465,345 | A | 8/1984 | Yazawa |
| 4,792,822 | A | 12/1988 | Akiyama et al. |
| 5,000,551 | A | 3/1991 | Shibayama |
| 5,327,291 | A | 7/1994 | Baker et al. |
| 5,331,465 | A | 7/1994 | Miyano |
| 5,491,507 | A * | 2/1996 | Umezawa ............... H04N 7/142 379/433.02 |
| 5,825,408 | A * | 10/1998 | Yuyama ............... H04N 1/0044 348/14.02 |
| 5,969,869 | A | 10/1999 | Hirai et al. |
| 6,014,266 | A | 1/2000 | Obama et al. |
| 6,035,136 | A | 3/2000 | Hayashi et al. |
| 6,147,702 | A | 11/2000 | Smith |
| 6,169,636 | B1 | 1/2001 | Kreitzer |
| 6,177,950 | B1 * | 1/2001 | Robb ................. H04N 21/6131 348/E7.079 |
| 6,654,180 | B2 | 11/2003 | Ori |
| 7,030,926 | B2 * | 4/2006 | Miyake ................. H04N 23/58 348/14.02 |
| 7,187,504 | B2 | 3/2007 | Horiuchi |
| 7,206,136 | B2 | 4/2007 | Labaziewicz et al. |
| 7,515,351 | B2 | 4/2009 | Chen et al. |
| 7,564,635 | B1 | 7/2009 | Tang |
| 7,643,225 | B1 | 1/2010 | Tsai |
| 7,660,049 | B2 | 2/2010 | Tang |
| 7,684,128 | B2 | 3/2010 | Tang |
| 7,688,523 | B2 | 3/2010 | Sano |
| 7,692,877 | B2 | 4/2010 | Tang et al. |
| 7,697,220 | B2 | 4/2010 | Iyama |
| 7,738,186 | B2 | 6/2010 | Chen et al. |
| 7,777,972 | B1 | 8/2010 | Chen et al. |
| 7,782,375 | B2 * | 8/2010 | Chambers ............ H04N 23/698 348/335 |
| 7,813,057 | B2 | 10/2010 | Lin |
| 7,821,724 | B2 | 10/2010 | Tang et al. |
| 7,826,149 | B2 | 11/2010 | Tang et al. |
| 7,826,151 | B2 | 11/2010 | Tsai |
| 7,869,142 | B2 | 1/2011 | Chen et al. |
| 7,898,747 | B2 | 3/2011 | Tang |
| 7,916,401 | B2 | 3/2011 | Chen et al. |
| 7,918,398 | B2 | 4/2011 | Li et al. |
| 7,957,075 | B2 | 6/2011 | Tang |
| 7,957,076 | B2 | 6/2011 | Tang |
| 7,957,079 | B2 | 6/2011 | Tang |
| 7,961,406 | B2 | 6/2011 | Tang et al. |
| 8,000,031 | B1 | 8/2011 | Tsai |
| 8,004,777 | B2 | 8/2011 | Souma |
| 8,077,400 | B2 | 12/2011 | Tang |
| 8,149,523 | B2 | 4/2012 | Ozaki |
| 8,208,062 | B2 * | 6/2012 | Lin ....................... G03B 29/00 348/374 |
| 8,218,253 | B2 | 7/2012 | Tang |
| 8,228,622 | B2 | 7/2012 | Tang |
| 8,233,224 | B2 | 7/2012 | Chen |
| 8,253,843 | B2 | 8/2012 | Lin |
| 8,279,537 | B2 | 10/2012 | Sato |
| 8,363,337 | B2 | 1/2013 | Tang et al. |
| 8,395,851 | B2 | 3/2013 | Tang et al. |
| 8,400,717 | B2 | 3/2013 | Chen et al. |
| 8,451,549 | B2 | 5/2013 | Yamanaka et al. |
| 8,503,107 | B2 | 8/2013 | Chen et al. |
| 8,514,502 | B2 | 8/2013 | Chen |
| 8,570,668 | B2 | 10/2013 | Takakubo et al. |
| 8,718,458 | B2 | 5/2014 | Okuda |
| 8,780,465 | B2 | 7/2014 | Chae |
| 8,810,923 | B2 | 8/2014 | Shinohara |
| 8,854,745 | B1 | 10/2014 | Chen |
| 8,958,164 | B2 | 2/2015 | Kwon et al. |
| 9,185,291 | B1 | 11/2015 | Shabtay |
| 9,229,194 | B2 | 1/2016 | Yoneyama et al. |
| 9,235,036 | B2 | 1/2016 | Kato et al. |
| 9,279,957 | B2 | 3/2016 | Kanda et al. |
| 9,288,471 | B1 * | 3/2016 | Yang .................. G01B 11/245 |
| 9,438,792 | B2 | 9/2016 | Nakada et al. |
| 9,488,802 | B2 | 11/2016 | Chen et al. |
| 9,507,241 | B1 * | 11/2016 | Schantz ................. H04N 23/57 |
| 9,568,712 | B2 | 2/2017 | Dror et al. |
| 9,678,310 | B2 | 6/2017 | Iwasaki et al. |
| 9,769,390 | B2 * | 9/2017 | Pylkkanen ............. H04N 23/45 |
| 9,817,213 | B2 | 11/2017 | Mercado |
| 10,142,539 | B2 * | 11/2018 | Chern ................. H04N 9/3176 |
| 10,812,698 | B1 * | 10/2020 | Zhou .................. H04M 1/0264 |
| 11,140,249 | B2 * | 10/2021 | Chen .................. H04M 1/0264 |
| 2002/0118471 | A1 | 8/2002 | Imoto |
| 2003/0016214 | A1 * | 1/2003 | Sukeno ................ H04N 5/2621 348/E5.025 |
| 2003/0048542 | A1 | 3/2003 | Enomoto |
| 2005/0041300 | A1 | 2/2005 | Oshima et al. |
| 2005/0046740 | A1 * | 3/2005 | Davis .................... H04N 7/142 348/E7.079 |
| 2005/0062346 | A1 | 3/2005 | Sasaki |
| 2005/0128604 | A1 | 6/2005 | Kuba |
| 2005/0141103 | A1 | 6/2005 | Nishina |
| 2005/0168840 | A1 | 8/2005 | Kobayashi et al. |
| 2005/0270667 | A1 | 12/2005 | Gurevich et al. |
| 2006/0238902 | A1 | 10/2006 | Nakashima et al. |
| 2006/0275025 | A1 | 12/2006 | Labaziewicz et al. |
| 2007/0229983 | A1 | 10/2007 | Saori |
| 2007/0247726 | A1 | 10/2007 | Sudoh |
| 2007/0253689 | A1 | 11/2007 | Nagai et al. |
| 2008/0056698 | A1 | 3/2008 | Lee et al. |
| 2008/0088734 | A1 * | 4/2008 | Huang .................. H04N 23/58 348/374 |
| 2008/0094730 | A1 | 4/2008 | Toma et al. |
| 2008/0094738 | A1 | 4/2008 | Lee |
| 2008/0291531 | A1 | 11/2008 | Heimer |
| 2008/0304161 | A1 | 12/2008 | Souma |
| 2009/0002839 | A1 | 1/2009 | Sato |
| 2009/0067063 | A1 | 3/2009 | Asami et al. |
| 2009/0122423 | A1 | 5/2009 | Park et al. |
| 2009/0141365 | A1 | 6/2009 | Jannard et al. |
| 2009/0147368 | A1 | 6/2009 | Oh et al. |
| 2009/0225438 | A1 | 9/2009 | Kubota |
| 2009/0279191 | A1 | 11/2009 | Yu |
| 2009/0303620 | A1 | 12/2009 | Abe et al. |
| 2010/0033844 | A1 | 2/2010 | Katano |
| 2010/0060995 | A1 | 3/2010 | Yumiki et al. |
| 2010/0165476 | A1 | 7/2010 | Eguchi |
| 2010/0214664 | A1 | 8/2010 | Chia |
| 2010/0277813 | A1 | 11/2010 | Ito |
| 2011/0001838 | A1 | 1/2011 | Lee |
| 2011/0032409 | A1 | 2/2011 | Rossi et al. |
| 2011/0080655 | A1 | 4/2011 | Mori |
| 2011/0102911 | A1 | 5/2011 | Iwasaki |
| 2011/0115965 | A1 | 5/2011 | Engelhardt et al. |
| 2011/0149119 | A1 | 6/2011 | Matsui |
| 2011/0157430 | A1 | 6/2011 | Hosoya et al. |
| 2011/0188121 | A1 | 8/2011 | Goring et al. |
| 2011/0249347 | A1 | 10/2011 | Kubota |
| 2012/0062783 | A1 | 3/2012 | Tang et al. |
| 2012/0069455 | A1 | 3/2012 | Lin et al. |
| 2012/0092777 | A1 | 4/2012 | Tochigi et al. |
| 2012/0105708 | A1 | 5/2012 | Hagiwara |
| 2012/0147489 | A1 | 6/2012 | Matsuoka |
| 2012/0154929 | A1 | 6/2012 | Tsai et al. |
| 2012/0194923 | A1 | 8/2012 | Um |

(56) References Cited

U.S. PATENT DOCUMENTS

| | | |
|---|---|---|
| 2012/0229920 A1 | 9/2012 | Otsu et al. |
| 2012/0262806 A1 | 10/2012 | Lin et al. |
| 2013/0057971 A1 | 3/2013 | Zhao et al. |
| 2013/0088788 A1 | 4/2013 | You |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0168667 A1 | 6/2015 | Kudoh |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Marcado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Hun-Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0024319 A1 | 1/2018 | Lai et al. |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Sueh et al. |
| 2019/0025554 A1 | 1/2019 | Son |
| 2019/0075284 A1 | 3/2019 | Ono |
| 2019/0086638 A1 | 3/2019 | Lee |
| 2019/0107651 A1 | 4/2019 | Sade |
| 2019/0121216 A1 | 4/2019 | Shabtay et al. |
| 2019/0170965 A1 | 6/2019 | Shabtay et al. |
| 2019/0215440 A1 | 7/2019 | Rivard et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0333691 A1 | 10/2020 | Shabtay et al. |
| 2020/0351446 A1* | 11/2020 | Maalouf ............... H04N 23/66 |
| 2021/0263276 A1 | 8/2021 | Huang et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 | 12/1979 |
| JP | S59121015 A | 7/1984 |
| JP | 6165212 A | 4/1986 |
| JP | S6370211 A | 3/1988 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2012203234 A | 10/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019113878 A | 7/2019 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120096817 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |

(56) References Cited

FOREIGN PATENT DOCUMENTS

| WO | 2013058111 A1 | 4/2013 |
| WO | 2013063097 A1 | 5/2013 |
| WO | 2018130898 A1 | 7/2018 |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56
"Cheat sheet: how to understand f-stops", Internet article, Digital Camera World, 2017.

\* cited by examiner

SPIN-OUT 360-DEGREE CAMERA FOR SMARTPHONE

CROSS REFERENCE TO RELATED APPLICATIONS

This application claims the benefit of priority from U.S. provisional patent application No. 63/329,384 filed Apr. 9, 2022, which is incorporated herein by reference in its entirety.

FIELD

The subject matter disclosed herein relates in general to cameras embedded in mobile devices, in particular cameras embedded in smartphones.

BACKGROUND

Mobile electronic handheld devices ("mobile devices") such as smartphones or tablets having multiple cameras (or "multi-cameras") with different fields of view (FOVs) are ubiquitous. In the following, we use "mobile device" and "smartphone" interchangeably.

A well-known camera type in the photography field is the omnidirectional camera ("omni" meaning "all"), also known as "360-degree camera" or 360° camera. This is a camera having a FOV that covers an entire 360° sphere. Omnidirectional cameras are important and prevalent in areas where large visual field coverage is needed, such as in panoramic photography as well as in action and sport videography. For example, a 360° camera can be realized by using two sub-cameras, where (i) each of the sub-cameras covers a FOV of 180 degrees or more ("180-degree sub-camera") and (ii) the FOVs of the sub-cameras cover different segments of a scene. By combining (or "stitching") simultaneously captured images from the two sub-cameras, the entire 360° sphere is covered.

In recent years, there have been attempts to embed a 360° camera in mobile devices. However, the physical (or size) constraints of such cameras have hindered those attempts. In particular, the 180-degree sub-cameras must protrude from the mobile device's housing to be able to cover a FOV of 180 degrees or more. In general, a mobile device's industrial design is optimized for a low thickness and plane surfaces. The need for protrusion of a 360° camera conflicts with the aforementioned requirement for low thickness and plane surfaces and represents a technical challenge.

It would be advantageous to have a spin-out 360° camera integrated in a mobile device that is switchable between a "stowed" state—in which the camera module is inactive, and a "spun-out" state—in which the camera module is active and operational to capture the entire 360° sphere. The spin-out 360° camera protrudes only when the camera is in use (spun-out) and does not protrude when the camera is not in use (stowed). It is observed that the slimness and flatness are required only when the camera is inactive, e.g. when a mobile device is in a pocket or similar enclosed space. Thus, making the camera module spin-out and stow on request bridges the conflicting requirements.

SUMMARY

In various exemplary embodiments, there are provided camera modules, comprising: a first sub-camera comprising a first lens having a first effective focal length ($EFL_1$) and a first image sensor, the first sub-camera having a first field of view $FOV1 \geq 180$ degrees and being oriented along a camera module optical axis and pointing in a first direction; a second sub-camera comprising a second lens having a second effective focal length ($EFL_2$)=$EFL_1$ and a second image sensor, the second sub-camera having a second field of view $FOV2 \geq 180$ degrees and being oriented along the camera module optical axis and pointing in a second direction which is opposite to the first direction; and a spin-out actuator, wherein the first sub-camera and the second sub-camera are included in a camera housing, wherein the camera is operational to capture a 360 degree panoramic image or video stream by combining images obtained with the first sub-camera and with the second sub-camera, wherein the spin-out actuator is operational to rotate the camera housing around an axis perpendicular to the camera module optical axis for switching the camera between a stowed position and a spun-out position, wherein the camera module is active in the spun-out position.

In some examples, the camera module is included in a mobile device, wherein in the spun-out operational position the camera module optical axis is perpendicular to a front surface of the mobile device.

In some examples, the camera module is included in a mobile device, wherein in the stowed position the camera module optical axis is parallel to a front surface of the mobile device.

In some examples, the camera module is included in a mobile device, wherein in the stowed position the camera module housing is flush with both a front surface and a rear surface of the mobile device.

In some examples, the camera housing is rotated by 90 degrees for switching between the stowed position and the spun-out position.

In some examples, the camera module is included in a mobile device, the first image sensor and the second image sensor are mounted on a single printed circuit board.

In some examples, the camera module has a camera module height $H_M$ in the range of 5 mm-20 mm. In some examples, $H_M$ is in the range of 7 mm-11 mm.

In some examples, the camera module has a camera module width $W_M$ in the range of 10 mm-30 mm. In some examples, $W_M$ is in the range of 15 mm-20 mm.

In some examples, the spin-out actuator is an actuator selected from the group consisting of an electric stepper motor, a voice coil motor, and a shaped memory alloy actuator.

In some examples, the camera module comprises a spin-out mechanism to rotate the camera housing, wherein the spin-out mechanism includes a worm-screw and a worm wheel, and wherein the worm-screw engages with the worm wheel.

In some examples, $EFL_1$ and $EFL_2$ are in the range of 0.75 mm-2.5 mm. In some examples, $EFL_1$ and $EFL_2$ are in the range of 0.9 mm-1.5 mm. In some examples, $EFL_1$ and $EFL_2$ are in the range of 0.75 mm-2.5 mm $EFL_1$ and $EFL_2$ are in the range of 1 mm-1.2 mm.

In some examples, the first lens and the second lens each include N=6 lens elements. In some examples, a power sequence of the N=6 lens elements is negative-negative-positive-positive-negative-positive.

In some examples, a first lens element $L_1$ of both the first lens and the second lens is made of glass. In some examples, a last lens element $L_6$ of both the first lens and the second lens is the strongest lens element in the lens. In some examples, a last lens element $L_6$ of both the first lens and the second lens is the strongest lens element in the lens.

In some examples, a f number $f_3$ of a third lens element $L_3$ of both the first lens and the second lens fulfills $f_3<2\times$ EFL. In some examples, both the first lens and the second lens have a f number lower than 3.

In some examples, both FOV1 and FOV2 are smaller than 200 degrees.

In some examples, a camera module is included in a mobile device such as a smartphone.

In some examples, a camera module is included in a multi-camera. In some examples, the multi-camera is included in a mobile device such as a smartphone.

BRIEF DESCRIPTION OF THE DRAWINGS

Non-limiting examples are described below with reference to figures attached hereto that are listed following this paragraph. Identical structures, elements or parts that appear in more than one figure are generally labelled with a same numeral in all the figures in which they appear. The drawings and descriptions are meant to illuminate and clarify examples of the subject matter disclosed herein, and should not be considered limiting in any way. In the drawings.

DETAILED DESCRIPTION

Figure 1A:
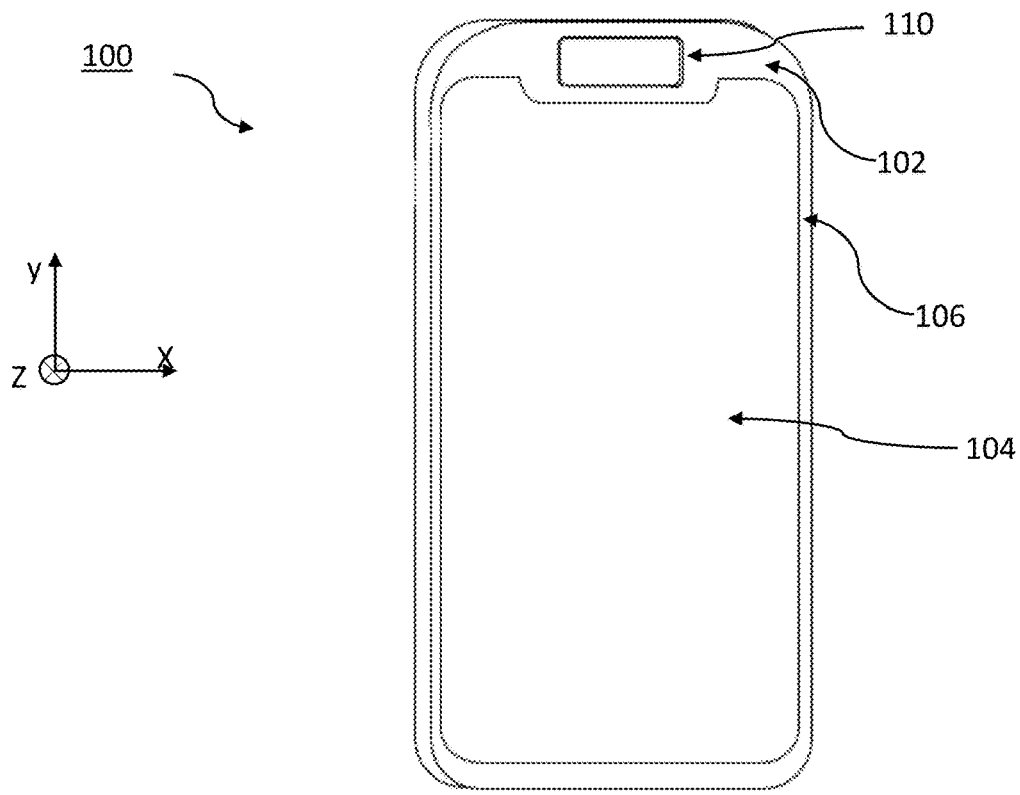
FIG. 1A illustrates a smartphone including a 360° camera disclosed herein in a stowed state in a front view.

FIG. 1A illustrates a smartphone 100 including a 360-degree camera 110 as disclosed herein in a "stowed" state in a front view. Hereinafter, 360° cameras described below may drop the "360°" term for simplicity. In the stowed state, camera 110 is inactive. Smartphone 100 includes a first area 102 which does not include a screen ("bezel area"), a second area 104 which includes a screen ("screen area"), and a housing (body) 106.

A front surface (or "user surface") of smartphone 100 is visible. "Front surface" of a smartphone is defined here as the surface of the smartphone that includes a screen. Accordingly, a "rear surface" (or "world facing surface") of a smartphone is defined here as a surface parallel to the front surface, but having a surface normal that points in an opposite direction than a surface normal of the front surface. In general, the rear surface does not include a screen. Camera 110 is included (i.e. embedded) in bezel area 102. Camera 110 includes two, first and second sub-cameras (not shown here), see 120 and 130 in FIGS. 2A-B. Optical axes of the first sub-camera and of the second sub-camera of camera 110 (not shown) are oriented parallel to the x-axis in the x-y-z coordinate system shown. In the stowed state, camera 110 is positioned so that it forms a plane surface (i.e. "is flush") with the surrounding bezel area 102. In the stowed state, an aperture of the first sub-camera and an aperture of the second sub-camera are not exposed and are therefore protected from damage in case of a drop or an impact.

Figure 1B:
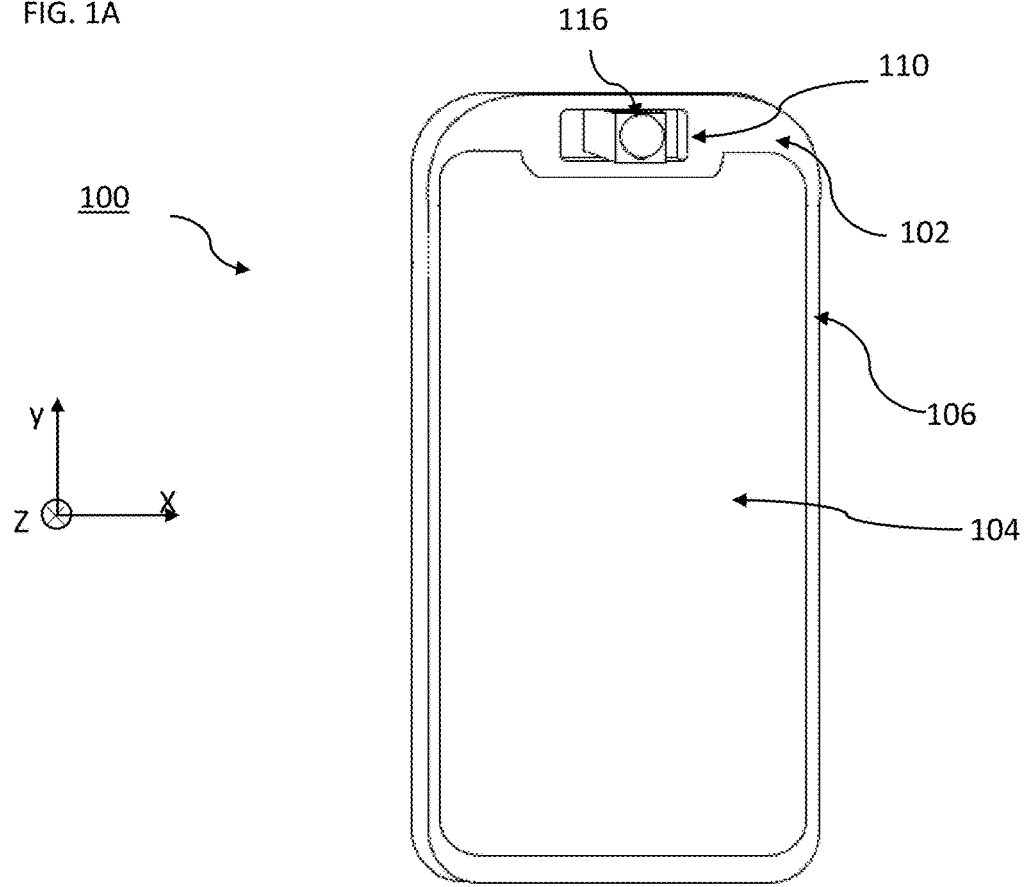
FIG. 1B illustrates the smartphone and 360° camera of FIG. 1A in a spun-out state in a front view.

FIG. 1B illustrates smartphone 100 including camera 110 in a "spun-out" state in the same view shown in FIG. 1A. In the spun-out state, camera 110 is active. A first aperture 116 of camera 110 is visible. The optical axes of the first sub-camera and of the second sub-camera of camera 110 are now oriented parallel to the z-axis. With respect to the stowed state in FIG. 1A, camera 110 is rotated by 90 degrees around the y-axis. In this (active) spun-out state, camera 110 has an unobstructed FOV of more than 180 degrees, i.e. the FOV of lenses of camera 110 is not obstructed by housing 106 or any other component included in smartphone 100. In other embodiments for switching a camera such as camera 110 from a stowed state to a spun-out state, the camera may be rotated by 90 degrees around the x-axis.

In some examples, camera 110 may be included in a multi-camera as known in the art. In a multi-camera, two or more cameras are included that have lenses with different focal lengths to capture images of a same scene with FOVs. For example, in addition to camera 110, a multi-camera may include a Wide camera having a Wide camera FOV ("$FOV_W$") of e.g. 80 degrees and a Tele (or "zoom") camera having a narrower FOV ("native $FOV_T$" or ("n-$FOV_T$")) of e.g. 25 degrees and with higher spatial resolution (for example 3-5 times higher) than that of the Wide camera. Smartphone 100 may in addition include an application processor ("AP"), e.g. configured to switch between different cameras in the multi-camera, to process image data of the multi-camera, to supply control signals for switching camera 110 from a stowed state to a spun-out state and vice versa etc.

Figure 2A:
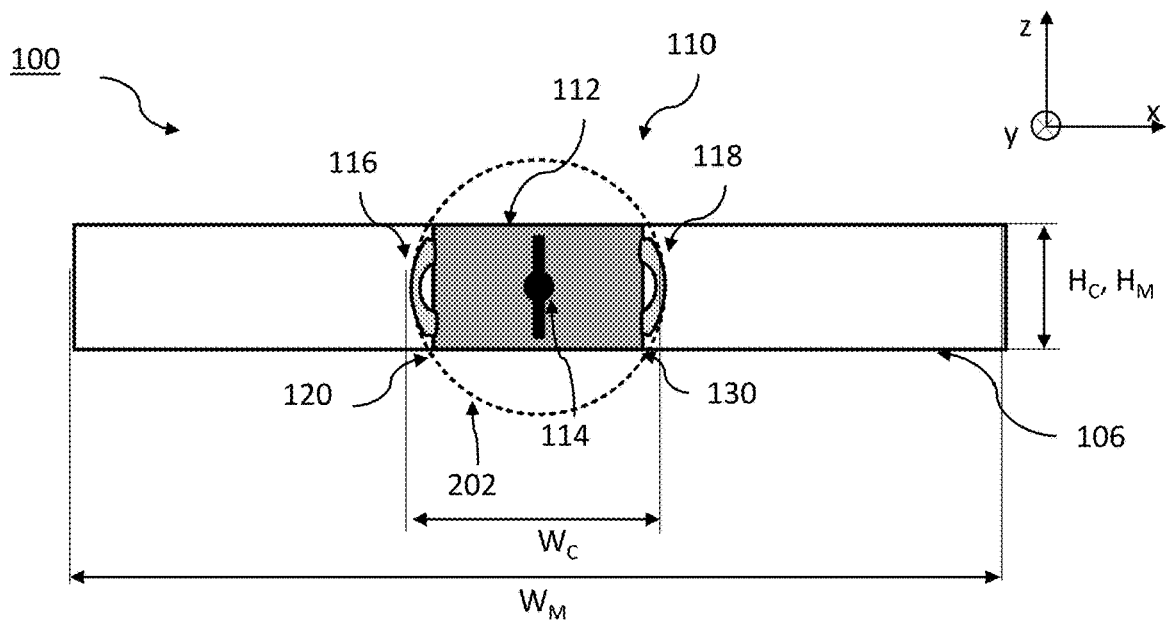
FIG. 2A illustrates the smartphone and 360° camera of FIGS. 1A-B in a stowed state in one side view.

FIG. 2A illustrates smartphone 100 including 360° camera 110 of FIGS. 1A-B in a stowed state in a cross-sectional view. Smartphone 100 has a smartphone module height $H_M$ and a smartphone module width $W_M$. Camera 110 includes a housing 112 and a pivot (or "rotation") axis 114. For switching camera 110 between a stowed (inactive) and a spun-out (operational) state, camera 110 is rotated by 90 degrees around pivot axis 114. Pivot axis 114 is substantially parallel to the y-axis. A first aperture 116 of first sub-camera 120 and a second aperture 118 of second sub-camera 130 of camera 110 are visible. In the inactive state, both first aperture 116 and second aperture 118 are directed towards the inwards of smartphone 100, i.e. camera 110 cannot capture a scene. Camera 110 has a camera width of $W_C$ (measured along the y-axis) and a camera height $H_C$ (measured along the z-axis). In some examples, $W_M$ may be 10 mm-30 mm and $H_M$ may be 5 mm-20 mm. In some examples, $W_M$ may be 15-20 mm and $H_M$ may be 7-11 mm. In some examples, $W_M$ may be 18 mm and $H_M$ may be 9 mm. A circle 202 is defined as the smallest circle that fully encircles (or contains) camera 110.

Figure 2B:
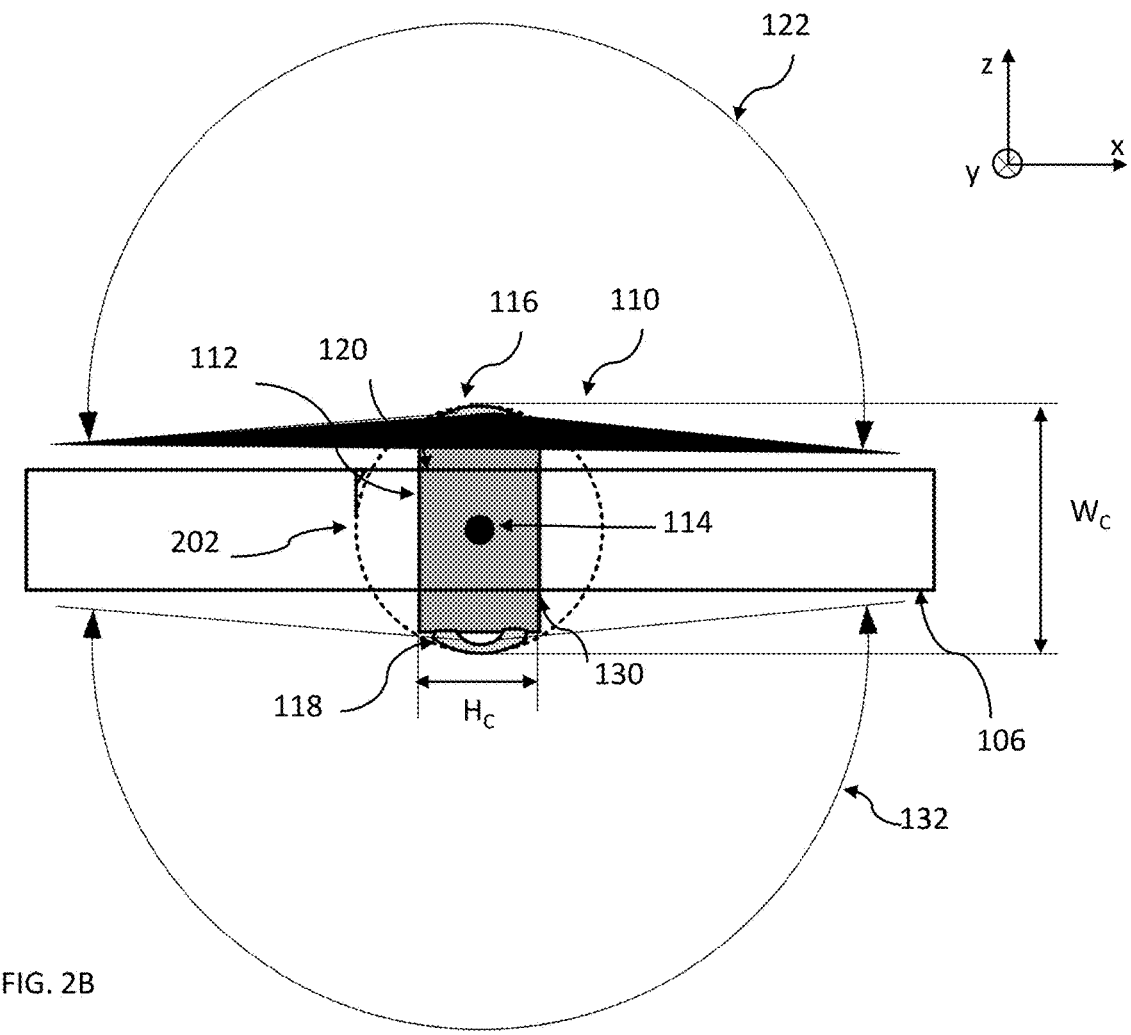
FIG. 2B illustrates the smartphone and 360° camera of FIGS. 1A-B in a spun-out state in one side view.

FIG. 2B illustrates smartphone 100 including camera 110 in a spun-out state in a cross-sectional view. Both first aperture 116 and second aperture 118 are directed towards a scene, and both first sub-camera 120 and second sub-camera 130 are operational to capture the scene. A first FOV 122 of first sub-camera 120 and a second FOV 132 of second sub-camera 130 may have identical sizes (values), or may be different. First FOV 122 and second FOV 132 may each cover about 150-210 degrees, or preferably they may cover 180-210 degrees.

Figure 3A:
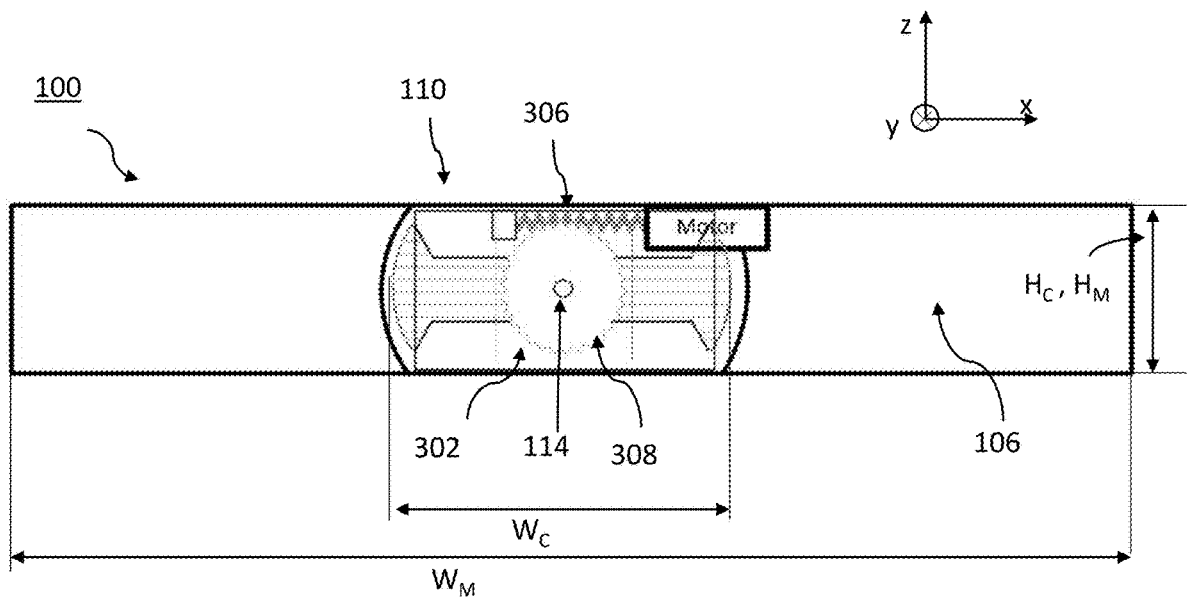
FIG. 3A illustrates the smartphone and 360° camera of FIGS. 1A-B in a stowed state in another side view.
Figure 3B:
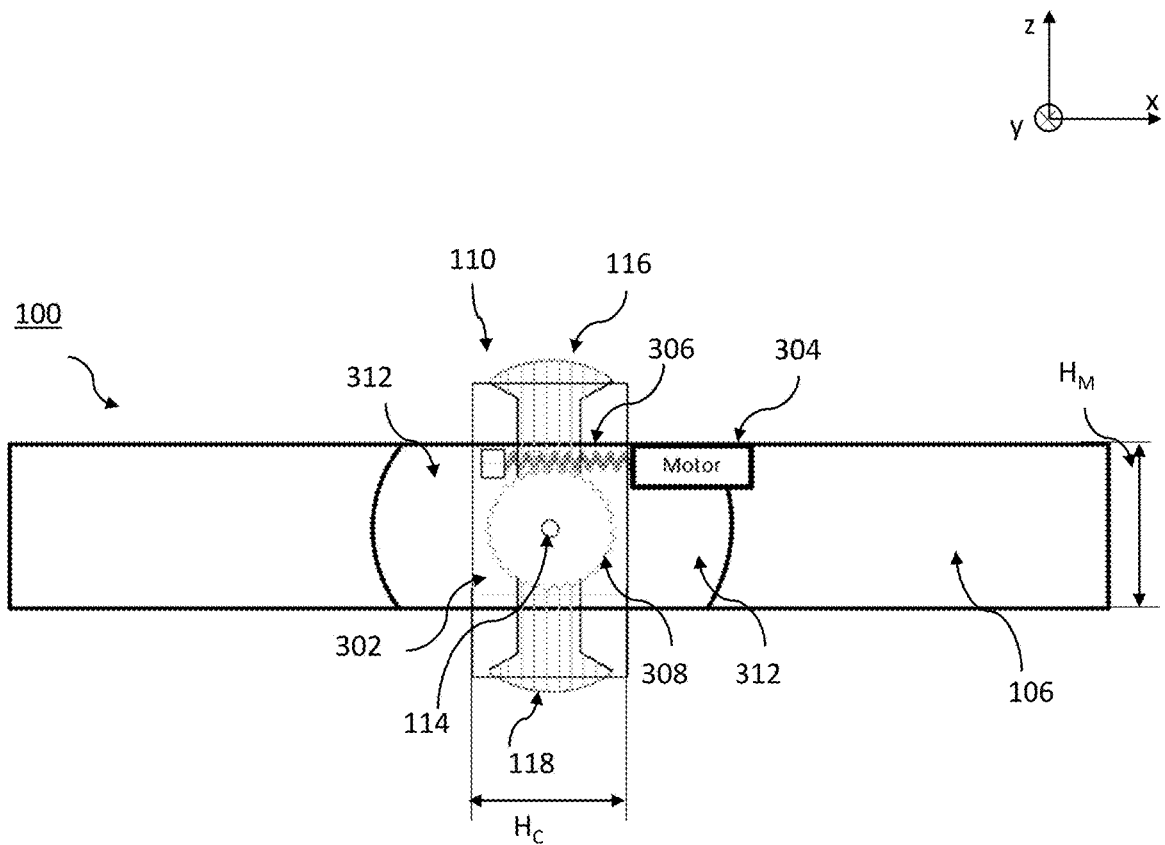
FIG. 3B illustrates the smartphone and 360° camera of FIGS. 1A-B in a spun-out state in another side view.

FIG. 3A and FIG. 3B illustrate smartphone 100 including camera 110 in another cross-sectional view in, respectively, stowed and spun-out states. Camera 110 includes a spin-out mechanism 302 operational to rotate camera 110 around pivot axis 114 for switching camera 110 between the stowed and spun-out states. Spin-out mechanism 302 includes an actuator 304 that is connected to a worm screw 306. Worm screw 306 engages with a worm wheel 308 to transmit the actuation of actuator 304 so that camera 110 is rotated around the y-axis at pivot 114. Actuator 304 may for example be an electric stepper motor, a voice coil motor (VCM), or a shaped memory alloy (SMA) actuator. In the spun-out state, a free space (or volume) 312 is generated.

Figure 4:
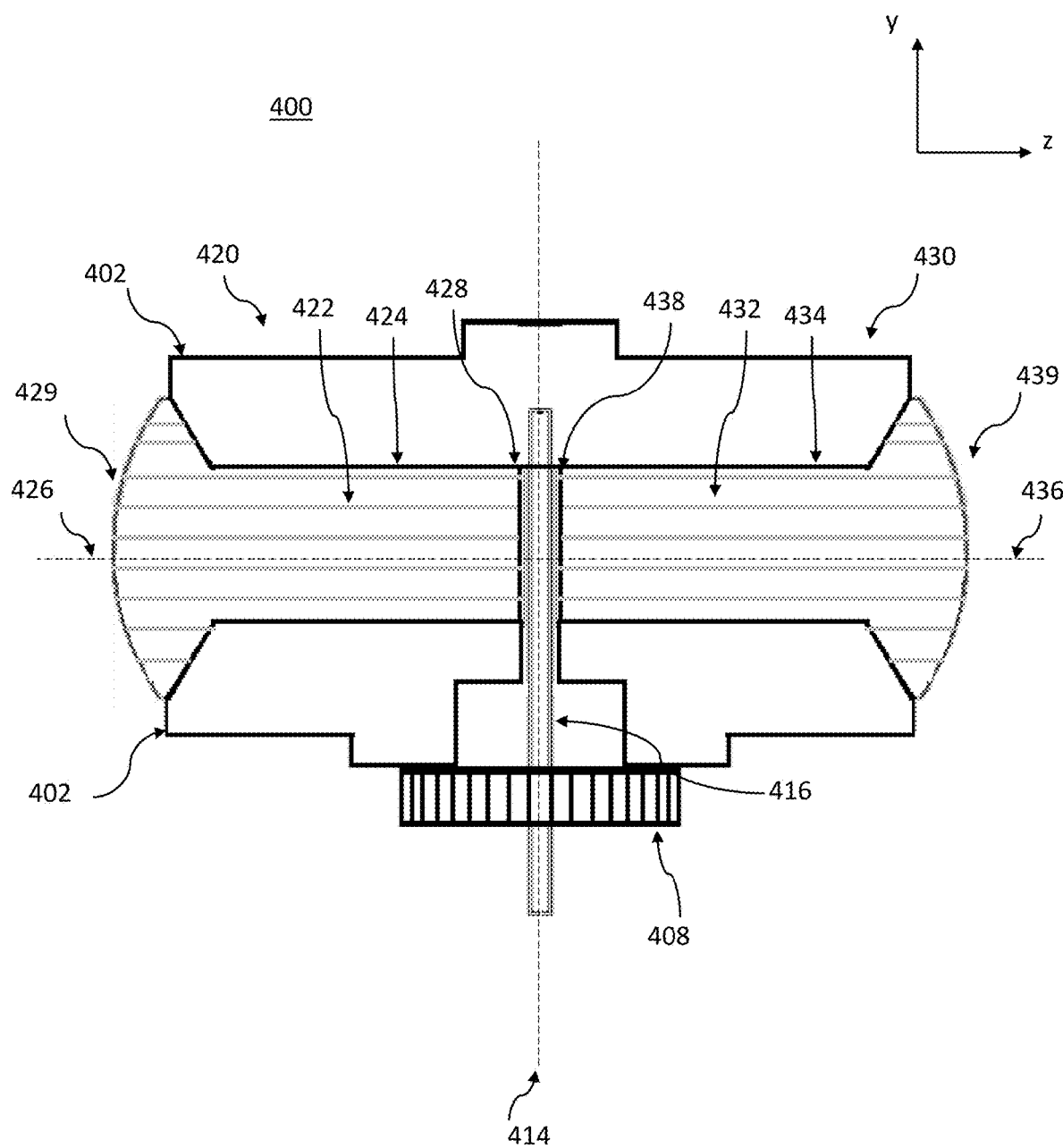
FIG. 4 illustrates another embodiment of a 360° camera disclosed herein.

FIG. 4 illustrates another example of a 360-degree camera disclosed herein and numbered 400. Camera 400 includes a first sub-camera 420, a second sub-camera 430, and a camera module housing 402. First sub-camera 420 and second sub-camera 430 include respectively lenses 422 and 432 included in lens barrels 424 and 434 and having lens optical axes 426 and 436, image sensors 428 and 438, and apertures 429 and 439. Image sensor 428 and image sensor 438 are oriented parallel to each other and perpendicular to optical axes 426 and 436, wherein the active regions (i.e. the regions including imaging pixels) of image sensor 428 and image sensor 438 face opposite directions. Image sensor 428 points towards (or faces) a negative z-direction, and image sensor 438 points towards (or faces) a positive z-direction. A pivot (rotation) axis 414 is substantially parallel to the y-axis. Image sensor 428 and image sensor 438 may both be mounted on a single printed circuit board (PCB) 416. In other examples, two or more PCBs may be used to mount two image sensors such as image sensor 428 and image sensor 438. To supply control signals and retrieve image data from camera 400, PCB 416 or the two or more PCBs may be electrically connected to a smartphone including camera 400 by a flexible electric cable (not shown). A worm wheel 408 may transmit the actuation required for switching camera 400 between a stowed state and a spun-out state.

Figure 5:
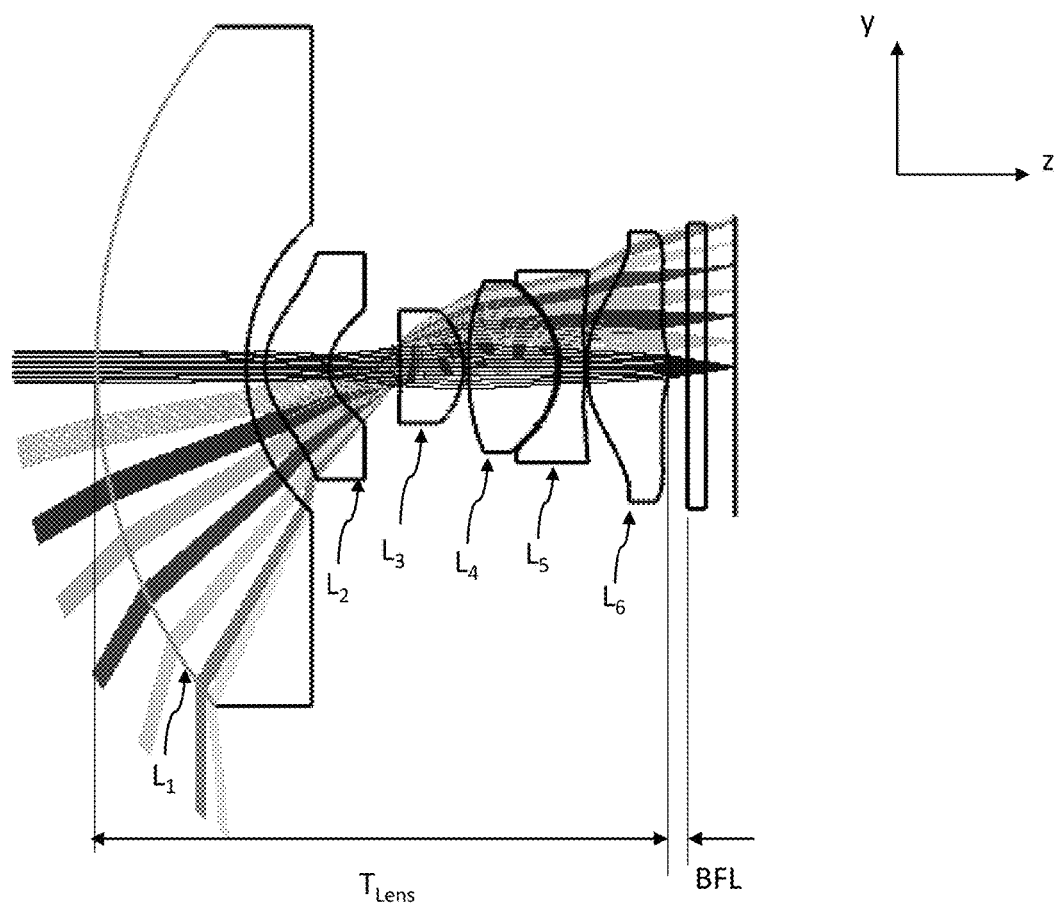
FIG. 5 shows an example of an optical lens system for use in a 360° camera disclosed herein.

FIG. 5 shows an example of an optical lens system disclosed herein and numbered 500. Optical lens system 500 comprises a lens 502, an image sensor 504 and, optionally, an optical element ("window") 506. Optical element 506 may be for example infra-red (IR) filter, and/or a glass image sensor dust cover. Optical lens system 500 may be used in a sub-camera of a 360-degree camera such as first sub-camera 420 and second sub-camera 430.

Optical rays pass through lens 502 and form an image on image sensor 504.

Detailed optical data and surface data for lens 502 are given in Tables 1-2. Optical lens system 500 has a FOV of 191 degrees, an EFL of 1.08 mm and a f number of 2.72.

Table 1 provides surface types and Table 2 provides aspheric coefficients.

The surface types are:

a) Plano: flat surfaces, no curvature b) Q type 1 (QT1) surface sag formula:

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, \; x = u^2$$

$$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

c) Even Asphere (ASP) surface sag formula:

$$z(r) = \frac{cr^2}{1 + \sqrt{1 - (1+k)c^2 r^2}} + \alpha_1 r^2 + \quad \text{(Eq. 2)}$$

$$\alpha_2 r^4 + \alpha_3 r^6 + \alpha_4 r^8 + \alpha_5 r^{10} + \alpha_6 r^{12} + \alpha_7 r^{14} + \alpha_8 r^{16}$$

where $\{z, r\}$ are the standard cylindrical polar coordinates, c is the paraxial curvature of the surface, k is the conic parameter, $r_{norm}$ is generally one half of the surface's clear aperture ("CA", or also "DA" for clear aperture diameter), and $A_n$ are the aspheric coefficients shown in lens data tables.

The Z axis is positive towards image. Values for CA are given as a clear aperture radius, i.e. D/2. The reference wavelength is 555.0 nm. Units in Table 1 are in mm except for refraction index ("Index") and Abbe #. Each lens element Li has a respective focal length $f_i$, both given in Table 1.

TABLE 1

Optical lens system 500
EFL = 1.08 mm, F# = 2.72, FOV = 191 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | Lens 1 | Standard | 6.529 | 1.784 | 4.068 | Glass | 1.95 | 32.3 | −4.679 |
| 2 | | | 2.303 | 0.222 | 1.725 | | | | |
| 3 | Lens 2 | QT1 | 0.824 | 0.763 | 1.358 | Plastic | 1.58 | 28.4 | −5.858 |
| 4 | | | 0.436 | 0.783 | 0.697 | | | | |
| 5 | A.S. | Plano | Infinity | 0.071 | 0.219 | | | | |
| 6 | Lens 3 | QT1 | −43.758 | 0.759 | 0.333 | Plastic | 1.53 | 55.7 | 1.607 |
| 7 | | | −0.8509 | 0.058 | 0.675 | | | | |
| 8 | Lens 4 | QT1 | 12.013 | 1.052 | 0.986 | Plastic | 1.53 | 55.7 | 2.741 |
| 9 | | | −1.624 | 0.041 | 1.024 | | | | |
| 10 | Lens 5 | QT1 | −1.956 | 0.294 | 1.009 | Plastic | 1.67 | 19.2 | −2.384 |
| 11 | | | 9.781 | 0.033 | 1.147 | | | | |
| 12 | Lens 6 | QT1 | 3.686 | 0.969 | 1.495 | Plastic | 1.54 | 55.9 | 1.345 |
| 13 | | | −0.832 | 0.232 | 1.617 | | | | |
| 14 | Filter | Plano | Infinity | 0.210 | — | Glass | 1.52 | 64.2 | |
| 15 | | | Infinity | 0.350 | — | | | | |
| 16 | Image | Plano | Infinity | — | — | | | | |

TABLE 2

| | | Aspheric Coefficients | | | | |
|---|---|---|---|---|---|---|
| Surface # | Norm Radius | Conic | A0 | A1 | A2 | A3 |
| 3 | 1.352 | −2.324 | −0.04791 | −0.05523 | 0.015938 | −0.00196 |
| 4 | 0.679 | −0.645 | −0.318956 | −0.019675 | −0.010019 | −0.001377429 |
| 5 (SA) | 0 | 0 | 0 | 0 | 0 | 0 |
| 6 | 0.544 | −1.662 | 0.022799 | 0.028698 | 0.010205 | −1.46082E−05 |
| 7 | 0.813 | −0.098 | 0.07629 | −0.007024 | 0.00877 | −0.007080169 |
| 8 | 1.304 | 124.913 | 0.176348 | −0.125627 | −0.006741 | −0.009985724 |
| 9 | 1.140 | 0.232 | −0.217642 | 0.109874 | −0.000286 | 0.001776936 |
| 10 | 1.431 | −0.240 | −0.193425 | 0.330347 | −0.11511 | −0.022503981 |
| 11 | 1.337 | 65.327 | −0.075806 | 0.035603 | −0.014417 | 0.005430028 |
| 12 | 1.362 | 3.497 | 0.304975 | −0.17175 | 0.057573 | −0.02251768 |
| 13 | 2.045 | −2.236 | 1.275921 | −0.720937 | 0.221204 | −0.21164209 |

| | Aspheric Coefficients (Continued) | | | | |
|---|---|---|---|---|---|
| Surface # | A4 | A5 | A6 | A7 | A8 |
| 3 | 3.92449E−05 | −0.00028 | −3.4466E−05 | 7.11888E−05 | −0.00011 |
| 4 | −0.001139 | −0.00034385 | −0.00011 | −5.09204E−06 | 3.11037E−06 |
| 5 (SA) | 0 | 0 | 0 | 0 | 0 |
| 6 | −0.007396 | −0.0105359 | −0.007271 | −0.002404784 | −9.43331E−05 |
| 7 | −0.001707 | 0.000908346 | 0.002366 | −0.000553186 | −0.00223188 |
| 8 | 0.01722 | 0.00132032 | −0.002979 | −0.006638898 | −0.002825671 |
| 9 | −0.005606 | −0.00098302 | −0.001488 | 0.001349993 | 0.002046746 |
| 10 | −0.019598 | 0.023306945 | −0.006583 | 0.012424048 | −0.009745867 |
| 11 | −0.029477 | 0.012113887 | −0.008651 | 0.007679978 | 0.003367427 |
| 12 | 0.006928 | −0.00083061 | −0.00035 | 0.00076921 | −0.000764853 |
| 13 | −0.03595 | −0.05541839 | 0.088623 | 0.08797425 | 0.064227559 |

Optical lens system 500 has an effective focal length ("EFL") of 1.08 mm. A power sequence of lenses $L_1$-$L_6$ included in lens 502 is negative-negative-positive-positive-negative-positive. $L_1$ is made of glass. A focal length of lens element $L_i$ is $f_i$, i=1-6. $f_3$<2·EFL and $f_6$<2·EFL or even $f_6$<1.5·EFL. $L_2$ is the lens element having a largest focal length magnitude, i.e. $|f_2|>|f_i|$, i=1, 3, . . . . In other embodiments, EFL may be in the range of 0.5 mm-5 mm, or even in the range 0.75 mm-2.5 mm, for example 0.9 mm-1.5 mm or 1 mm-1.2 mm.

For the sake of clarity, the term "substantially" is used herein to imply the possibility of variations in values within an acceptable range. According to one example, the term "substantially" used herein should be interpreted to imply possible variation of 0-10% over or under any specified value.

It is to be noted that the various features described in the various embodiments can be combined according to all possible technical combinations.

It is to be understood that the disclosure is not limited in its application to the details set forth in the description contained herein or illustrated in the drawings. The disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the disclosure as hereinbefore described without departing from its scope, defined in and by the appended claims.

What is claimed is:

1. A camera module, comprising:
a first sub-camera comprising a first lens having a first effective focal length ($EFL_1$) and a first image sensor, the first sub-camera having a first field of view FOV1≥180 degrees and being oriented along a camera module optical axis and pointing in a first direction;
a second sub-camera comprising a second lens having a second effective focal length ($EFL_2$)=$EFL_1$ and a second image sensor, the second sub-camera having a second field of view FOV2≥180 degrees and being oriented along the camera module optical axis and pointing in a second direction which is opposite to the first direction; and
a spin-out actuator,
wherein the first sub-camera and the second sub-camera are included in a camera housing,
wherein the camera is operational to capture a 360 degree panoramic image or video stream by combining images obtained with the first sub-camera and with the second sub-camera,
wherein the spin-out actuator is operational to rotate the camera housing around an axis perpendicular to the camera module optical axis for switching the camera between a stowed position and a spun-out position,
wherein the camera module is active in the spun-out position.

2. The camera module of claim 1, wherein $EFL_1$ and $EFL_2$ are in the range of 0.75 mm-2.5 mm.

3. The camera module of claim 1, included in a mobile device, wherein in the spun-out operational position the camera module optical axis is perpendicular to a front surface of the mobile device.

4. The camera module of claim 1, included in a mobile device, wherein in the stowed position the camera module optical axis is parallel to a front surface of the mobile device.

5. The camera module of claim 1, included in a mobile device, wherein in the stowed position the camera module housing is flush with both a front surface and a rear surface of the mobile device.

6. The camera module of claim 1, wherein the camera housing is rotated by 90 degrees for switching between the stowed position and the spun-out position.

7. The camera module of claim 1, wherein the first image sensor and the second image sensor are mounted on a single printed circuit board.

8. The camera module of claim 1, wherein the camera module has a camera module height $H_M$ in the range of 5 mm-20 mm.

9. The camera module of claim 8, wherein $H_M$ is in the range of 7 mm-11 mm.

10. The camera module of claim 1, wherein the camera module has a camera module width $W_M$ in the range of 10 mm-30 mm.

11. The camera module of claim 10, wherein $W_M$ is in the range of 15 mm-20 mm.

12. The camera module of claim 1, wherein the spin-out actuator is an actuator selected from the group consisting of an electric stepper motor, a voice coil motor, and a shaped memory alloy actuator.

13. The camera module of claim 1, wherein the camera module comprises a spin-out mechanism to rotate the camera housing, wherein the spin-out mechanism includes a worm-screw and a worm wheel, and wherein the worm-screw engages with the worm wheel.

14. The camera module of claim 1, wherein $EFL_1$ and $EFL_2$ are in the range of 0.9 mm-1.5 mm.

15. The camera module of claim 1, wherein $EFL_1$ and $EFL_2$ are in the range of 1 mm-1.2 mm.

16. The camera module of claim 1, wherein the first lens and the second lens each include N=6 lens elements.

17. The camera module of claim 16, wherein a power sequence of the N=6 lens elements is negative-negative-positive-positive-negative-positive.

18. The camera module of claim 1, wherein a first lens element Li of both the first lens and the second lens is made of glass.

19. The camera module of claim 1, wherein a last lens element Lo of both the first lens and the second lens is the strongest lens element in the lens.

20. The camera module of claim 1, wherein a last lens element $L_6$ of both the first lens and the second lens is the strongest lens element in the lens.

21. The camera module of claim 1, wherein an f number $f_3$ of a third lens element $L_3$ of both the first lens and the second lens fulfills $f_3 < 2 \times EFL$.

22. The camera module of claim 1, wherein both the first lens and the second lens have a f number lower than 3.

23. The camera module of claim 1, wherein both FOV1 and FOV2 are smaller than 200 degrees.

24. The camera module of claim 1, included in a multi-camera.

25. The camera module of claim 1, included in a smartphone.

* * * * *